(12) United States Patent
Jung et al.

(10) Patent No.: US 9,655,016 B2
(45) Date of Patent: *May 16, 2017

(54) METHOD AND APPARATUS FOR SUPPORTING CSG SERVICE IN WIRELESS COMMUNICATION SYSTEM

(71) Applicant: LG ELECTRONICS INC., Seoul (KR)

(72) Inventors: Sung Hoon Jung, Anyang-si (KR); Seung June Yi, Anyang-si (KR); Young Dae Lee, Anyang-si (KR); Sung Duck Chun, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,852

(22) Filed: Mar. 8, 2016

(65) Prior Publication Data

US 2016/0192250 A1 Jun. 30, 2016

Related U.S. Application Data

(63) Continuation of application No. 14/635,762, filed on Mar. 2, 2015, now Pat. No. 9,319,947, which is a
(Continued)

(51) Int. Cl.
*H04W 36/00* (2009.01)
*H04W 4/08* (2009.01)
*H04W 8/18* (2009.01)
*H04W 36/30* (2009.01)
*H04W 24/10* (2009.01)
*H04W 84/04* (2009.01)
*H04W 48/02* (2009.01)
*H04W 88/06* (2009.01)

(52) U.S. Cl.
CPC ......... *H04W 36/0083* (2013.01); *H04W 4/08* (2013.01); *H04W 8/186* (2013.01); *H04W 24/10* (2013.01); *H04W 36/00* (2013.01); *H04W 36/0061* (2013.01); *H04W 36/30* (2013.01); *H04W 48/02* (2013.01); *H04W 84/042* (2013.01); *H04W 84/045* (2013.01); *H04W 88/06* (2013.01)

(58) Field of Classification Search
CPC .................................................. H04W 36/0083
USPC .......................................................... 370/331
See application file for complete search history.

(56) References Cited

U.S. PATENT DOCUMENTS 8,446,869 B2 5/2013 Lee et al.
8,588,738 B2 11/2013 Gholmieh et al.
(Continued)

OTHER PUBLICATIONS

Seidel, "LTE Home Node Bs and its enhancements in Release 9," Nomor Research GmbH, May 2010, 5 pages.

*Primary Examiner* — Melvin Marcelo
*Assistant Examiner* — Peter G Solinsky
(74) *Attorney, Agent, or Firm* — Lee, Hong, Degerman, Kang & Waimey

(57) ABSTRACT

A method and apparatus for supporting a closed subscriber group (CSG) service is provided. A user equipment determines whether a neighbor cell is a CSG member cell for which a CSG whitelist includes a CSG identity of the neighbor cell and PLMN identities of the neighbor cell. The user equipment sends a CSG membership indicator indicating whether the neighbor cell is the CSG member cell.

14 Claims, 9 Drawing Sheets

Related U.S. Application Data continuation of application No. 14/471,872, filed on Aug. 28, 2014, now Pat. No. 9,008,667, which is a continuation of application No. 13/585,559, filed on Aug. 14, 2012, now Pat. No. 8,848,592.

(60) Provisional application No. 61/523,830, filed on Aug. 15, 2011.

(56) References Cited

U.S. PATENT DOCUMENTS

| | | |
|---|---|---|
| 8,588,782 B2 | 11/2013 | Lee et al. |
| 8,626,155 B2 | 1/2014 | Rune et al. |
| 2009/0238114 A1 | 9/2009 | Deshpande et al. |
| 2009/0239533 A1 | 9/2009 | Somasundaram et al. |
| 2011/0294508 A1 | 12/2011 | Min et al. |
| 2012/0028645 A1 | 2/2012 | Kim et al. |
| 2012/0033679 A1 | 2/2012 | Horn |
| 2012/0207129 A1 | 8/2012 | Sun |
| 2013/0003697 A1 | 1/2013 | Adjakple et al. |
| 2013/0029588 A1 | 1/2013 | Bienas et al. |
| 2014/0011519 A1 | 1/2014 | Lee et al. |

METHOD AND APPARATUS FOR SUPPORTING CSG SERVICE IN WIRELESS COMMUNICATION SYSTEM

CROSS-REFERENCE TO RELATED APPLICATIONS

This application is a continuation of U.S. patent application Ser. No. 14/635,762, filed on Mar. 2, 2015, now U.S. Pat. No. 9,319,947, which is a continuation of U.S. patent application Ser. No. 14/471,872, filed on Aug. 28, 2014, now U.S. Pat. No. 9,008,667, which is a continuation of U.S. patent application Ser. No. 13/585,559, filed on Aug. 14, 2012, now U.S. Pat. No. 8,848,592, which claims the benefit of U.S. Provisional Patent Application No. 61/523,830, filed on Aug. 15, 2011, the contents of which are all hereby incorporated by reference herein in their entirety.

BACKGROUND OF THE INVENTION

Field of the Invention

The present invention relates to wireless communications, and more particularly, to a method and apparatus for supporting a closed subscriber group (CSG) service in a wireless communication system.

Related Art

The Third Generation Partnership Project (3GPP) Long Term Evolution (3GPP LTE) which is a set of enhancements to the Universal Mobile Telecommunications System (UMTS) is introduced as 3GPP Release 8. The 3GPP LTE uses orthogonal frequency division multiple access (OFDMA) for the downlink, and single carrier frequency division multiple access (SC-FDMA) for the uplink, and adopts multiple input multiple output (MIMO) with up to 4 antennas. Research is now underway on 3GPP LTE-Advanced (LTE-A), which is a major enhancement to 3GPP LTE.

Closed subscriber group (CSG) services, which are services that can be provided only to a certain group of subscribers, have been introduced to improve quality of service. A base station (BS) capable of providing CSG services is referred to as a Home eNodeB (HNB), and a cell serving CSG members is referred to as a CSG cell. The basic requirements regarding CSG services are as disclosed in 3GPP TS 22.220 V1.0.1 (2008-12) "Service requirements for Home NodeBs and Home eNodeBs (Release 9)".

Given that most CSG services are provided at higher costs than other typical wireless communication services, it is important to guarantee the quality of CSG services.

There is a need for a method and apparatus to improve the quality of CSG services.

SUMMARY OF THE INVENTION

The present invention provides a method and apparatus for supporting a closed subscriber group (CSG) service in a wireless communication system.

The present invention also provides a method and apparatus for providing CSG subscription information in a wireless communication system.

In an aspect, a method for supporting a closed subscriber group (CSG) service in a wireless communication system is provided. The method includes receiving, by user equipment, from a serving cell, a CSG request for CSG subscription of a neighbor cell, receiving, by the user equipment, cell information broadcast by the neighbor cell, the cell information including a CSG identity of the neighbor cell, a first Public Land Mobile Network (PLMN) identity and at least one second PLMN identity, determining, by the user equipment, whether the neighbor cell is a CSG member cell for which a CSG whitelist of the user equipment includes the CSG identity and one of the first PLMN identity and the at least one second PLMN identity, and reporting, by the user equipment, to the serving cell, CSG subscription information, the CSG subscription information including the CSG identity of the neighbor cell and a CSG membership indicator indicating whether the neighbor cell is the CSG member cell.

The CSG request may be associated with a handover to the neighbor cell.

In another aspect, a user equipment configured for supporting a closed subscriber group (CSG) service in a wireless communication system is provided. The user equipment includes a memory configured to store a CSG whitelist of the user equipment, and a processor operatively coupled to the memory and configured to receive, from a serving cell, a CSG request for CSG subscription of a neighbor cell, receive cell information broadcast by the neighbor cell, the cell information including a CSG identity of the neighbor cell, a first Public Land Mobile Network (PLMN) identity and at least one second PLMN identity, determine whether the neighbor cell is a CSG member cell for which the CSG whitelist of the user equipment includes the CSG identity and one of the first PLMN identity and the at least one second PLMN identity, and report, to the serving cell, CSG subscription information, the CSG subscription information including the CSG identity of the neighbor cell and a CSG membership indicator indicating whether the neighbor cell is the CSG member cell.

DESCRIPTION OF EXEMPLARY EMBODIMENTS

Figure 1:
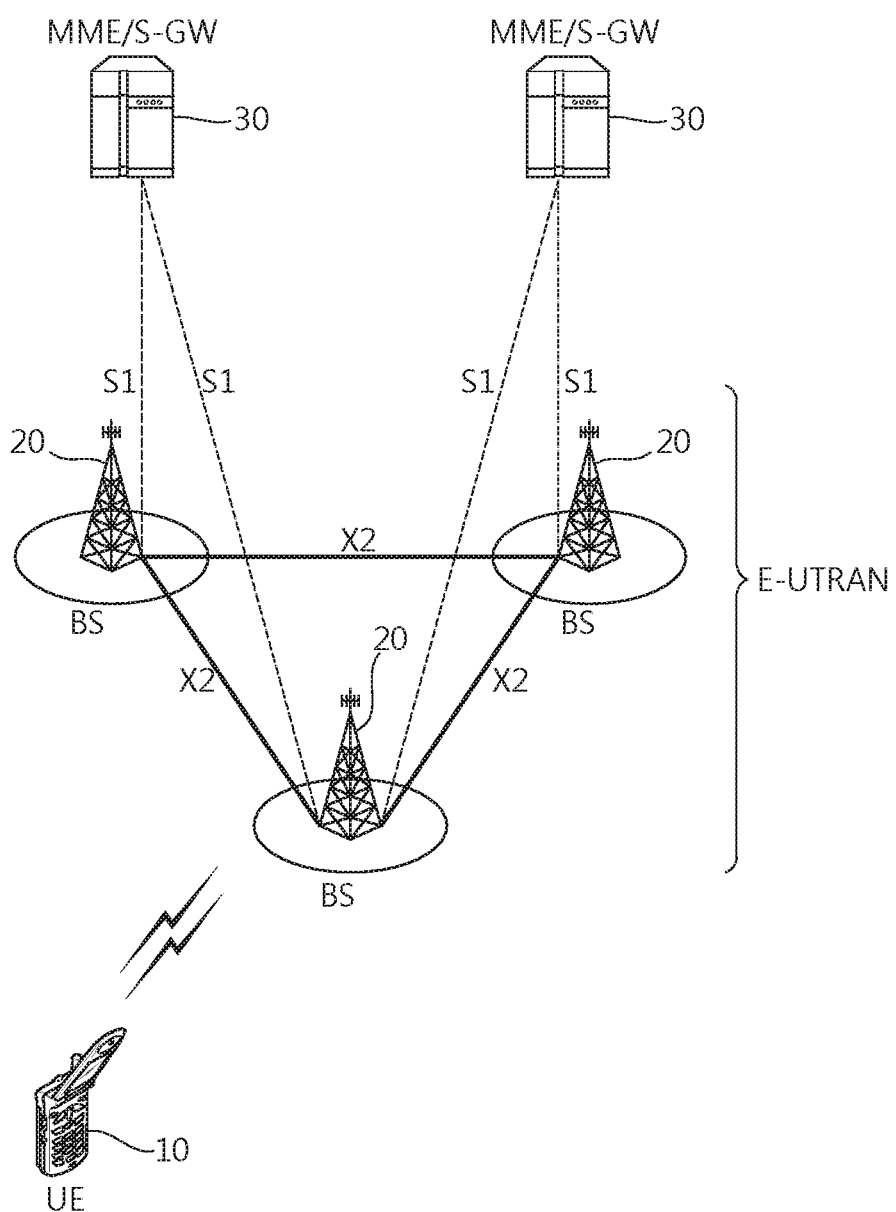
FIG. 1 is a view illustrating a mobile communication system to which the present invention are applied.

FIG. 1 is a view illustrating a mobile communication system to which the present invention are applied. This system may be also referred to as an Evolved-UMTS Terrestrial Radio Access Network (E-UTRAN) or a Long Term Evolution (LTE)/LTE-advanced (LTE-A) system.

The E-UTRAN includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like.

The BSs 20 are interconnected with each other by means of an X2 interface. The BSs 20 are also connected by means of the S1 interface to the EPC (Evolved Packet Core) 30, more specifically to the Mobility Management Entity (MME) by means of the S1-MME and to the Serving Gateway (S-GW) by means of the S1-U.

The EPC 30 may include the MME, the S-GW, and a Packet Data Network-Gateway (P-GW). The MME has information on the connection of UE or the capability of UE, and such information is primarily used for the mobility management of the UE. The S-GW is a gateway having E-UTRAN as an end point, and the P-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (RRC) layer located at the third layer plays a role of controlling radio resources between UE and a network. For the purpose of this, the RRC layer exchanges RRC messages between UE and a network.

Figure 2:
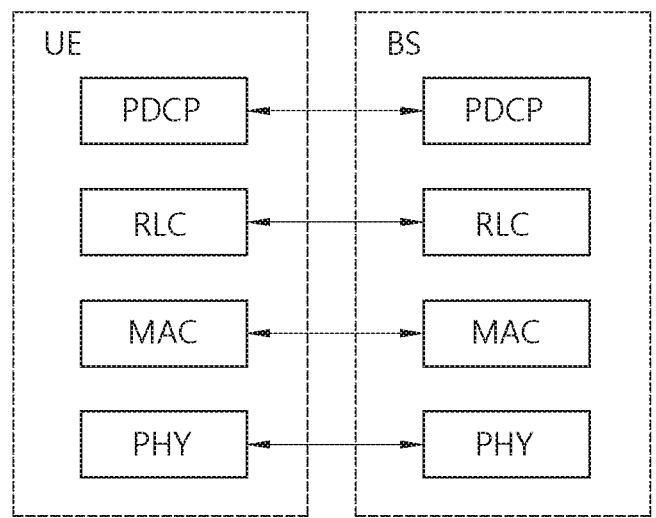
FIG. 2 is a block diagram showing radio protocol architecture for a user plane.
Figure 3:
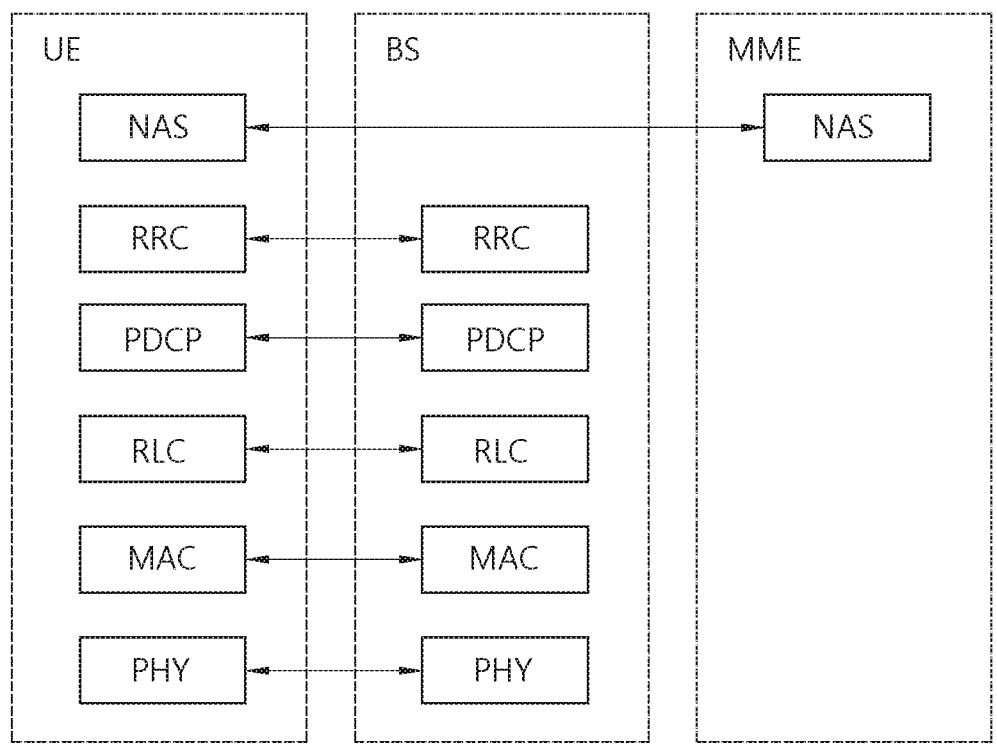
FIG. 3 is a block diagram showing radio protocol architecture for a control plane.

FIG. 2 is a block diagram showing radio protocol architecture for a user plane. FIG. 3 is a block diagram showing radio protocol architecture for a control plane. The data plane is a protocol stack for user data transmission and the control plane is a protocol stack for control signal transmission.

Referring to FIGS. 2 and 3, a physical (PHY) layer provides information transfer services to upper layers on a physical channel. The PHY layer is coupled with a MAC (Medium Access Control) layer, i.e., an upper layer of the PHY layer, through transport channels. Data is transferred between the MAC layer and the PHY layer through the transport channel. The transport channels are classified by how and with what characteristics data are transferred over the radio interface.

Between different physical layers, i.e., the physical layer of a transmitter and the physical layer of a receiver, data are transferred through the physical channel. The physical channel may be modulated by an Orthogonal Frequency Division Multiplexing (OFDM) scheme, and time and frequency are used as radio resources for the physical channel.

The functions of the MAC layer include mapping between logical channels and transport channels, and multiplexing/demultiplexing of MAC SDUs (Service Data Units) belonging to one or different logical channels into/from transport blocks (TBs) delivered to/from the PHY layer on transport channels. The MAC layer provides services to a RLC (Radio Link Control) layer through logical channels.

The functions of the RLC layer include concatenation, segmentation and reassembly of RLC SDUs. In order to guarantee various quality of services (QoSs) required by radio bearers (RBs), the RLC layer provides three operating modes: TM (Transparent Mode), UM (Unacknowledged Mode) and AM (Acknowledged Mode). The AM RLC provides error correction through automatic repeat request (ARQ).

The functions of a Packet Data Convergence Protocol (PDCP) layer for the user plane include transfer of user data, header compression/decompression and ciphering/deciphering. The functions of the PDCP layer for the control plane include transfer of control plane data, and ciphering and integrity protection.

A Radio Resource Control (RRC) layer is defined only in the control plane. The RRC layer serves to control the logical channels, the transport channels and the physical channels in association with configuration, reconfiguration and release of radio bearers (RBs). A RB means a logical path provided by a first layer (i.e. PHY layer) and second layers (i.e. MAC layer, RLC layer and PDCP layer) for data transmission between a UE and a network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane.

If an RRC connection is established between a RRC layer of the UE and a RRC layer of the E-UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple symbols inn time domain and multiple sub-carriers in frequency domain. A sub-frame includes a plurality of symbols in the time domain. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A Transmission Time Interval (TTI) as a unit time for transmitting data is 1 ms, corresponding to one sub-frame.

Hereinafter, an RRC state and an RRC connection method of UE will be described in detail.

The RRC state refers to whether or not the RRC layer of the UE is logically connected to the RRC layer of the E-UTRAN. If connected, then it is called an RRC_CONNECTED state, and otherwise it is called an RRC_IDLE state. For the UE in an RRC_CONNECTED state, the E-UTRAN can recognize the existence of the relevant UE in a cell unit because there exist an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the corresponding cell. The UE camped in an RRC_IDLE state makes an RRC connection with the E-UTRAN through an RRC connection procedure when it is required to make an RRC connection, thereby changing the state to an RRC_CONNECTED state. There are several cases when the UE in the RRC_IDLE state is required to make an RRC connection. For example, an uplink data transmission may be required due to a phone call attempt by the user, or the like, or the transmission of a response message may be required in response to a paging message received from the E-UTRAN.

A Non-Access Stratum (NAS) layer belonging to the upper layer of the RRC layer serves to perform session management and mobility management.

In order to manage the mobility of the UE at the NAS layer, both an EPS Mobility Management-REGISTERED (EMM-REGISTERED) state and an EMM-DEREGISTERED state are defined, and both states will be applied to the UE and the MME. The UE is initially in an EMM-DEREGISTERED state, and carries out a process of registering it into the corresponding network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an S1 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or cell reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the corresponding location of the UE.

A Public Land Mobile Network (PLMN) is a network deployed and operated by mobile network operator(s). Each mobile network operator runs one or more PLMNs. Each PLMN can be identified with the Mobile Country Code (MCC) and the Mobile Network Code (MNC). The PLMN information of a cell is broadcast in the system information. When UE is powered on, PLMN selection is triggered. For the selected PLMN, UE attempts to register the selected PLMN. If the registration is successful, the selected PLMN becomes a registered PLMN (RPLMN). Network can signal to the UE a list of PLMN for which the UE considers those PLMNs in the PLMN list equivalent to its RPLMN. The PLMN equivalent to RPLMN is called as an equivalent PLMN (EPLMN). The UE that registered with network should be reachable by the network at any time. If the UE is in a ECM-CONNECTED (equivalently RRC_CONNECTED), the network is aware of the cell the UE is being served. However, while the UE is in a ECM-IDLE (equivalently RRC_IDLE), the context of the UE is not available at the BS but stored in the MME. In this case, the location of the UE in ECM-IDLE is only known to the MME at the granularity of a list of Tracking Area (TA)s. A single TA is identified by the Tracking Area Identity (TAI) which consists of the PLMN Identity the tracking area belongs to and the Tracking Area Code (TAC) that uniquely represents the TA in the PLMN.

Network services provided to UE can be divided into three types as follows. Furthermore, the UE may recognize the type of a cell differently based on which service can be received. First, the type of services will be described, and then the type of a cell will be described below.

1) Limited service: This service provides an emergency call and an earthquake and tsunami warning system (ETWS), and may be provided in an acceptable cell.

2) Normal service: This service denotes a public use with general purposes, and may be provided in a suitable or normal cell.

3) Operator service: This service denotes a service for communication network service providers, and this cell can be only used by communication network service providers but cannot be used by typical users.

With regard to the service types provided by a cell, the type of a cell can be divided as follows.

1) Acceptable cell: A cell in which the UE can receive a limited service. This cell is not barred and satisfies the cell selection criteria of the UE from a standpoint of the corresponding UE.

2) Suitable cell: A cell in which the UE can receive a normal service. This cell satisfies the condition of an acceptable cell, and at the same time satisfies additional conditions. For additional conditions, the cell should be attached to PLMN to which the corresponding UE can be accessed, and it should be a cell in which the implementation of a tracking area update procedure by the UE is not barred. If the relevant (or corresponding) cell is a CSG cell, then it should be a cell that can be accessed by the UE as a CSG member.

3) Barred cell: A cell broadcasting information that it is a barred cell through the system information.

4) Reserved cell: A cell broadcasting that it is a reserved cell through the system information.

Hereinafter, Closed Subscriber Group (CSG) will be described.

A base station which provides CSG service is called a Home Node B (HNB) or Home eNB (HeNB) in 3GPP. Hereinafter, both the HNB and HeNB are commonly designated as a HNB. An object of the HNB is basically to provide specialized services only to a member of the CSG. However, those services may be provided to other users in addition to the CSG depending on the operation mode setting of the HNB.

Figure 4:
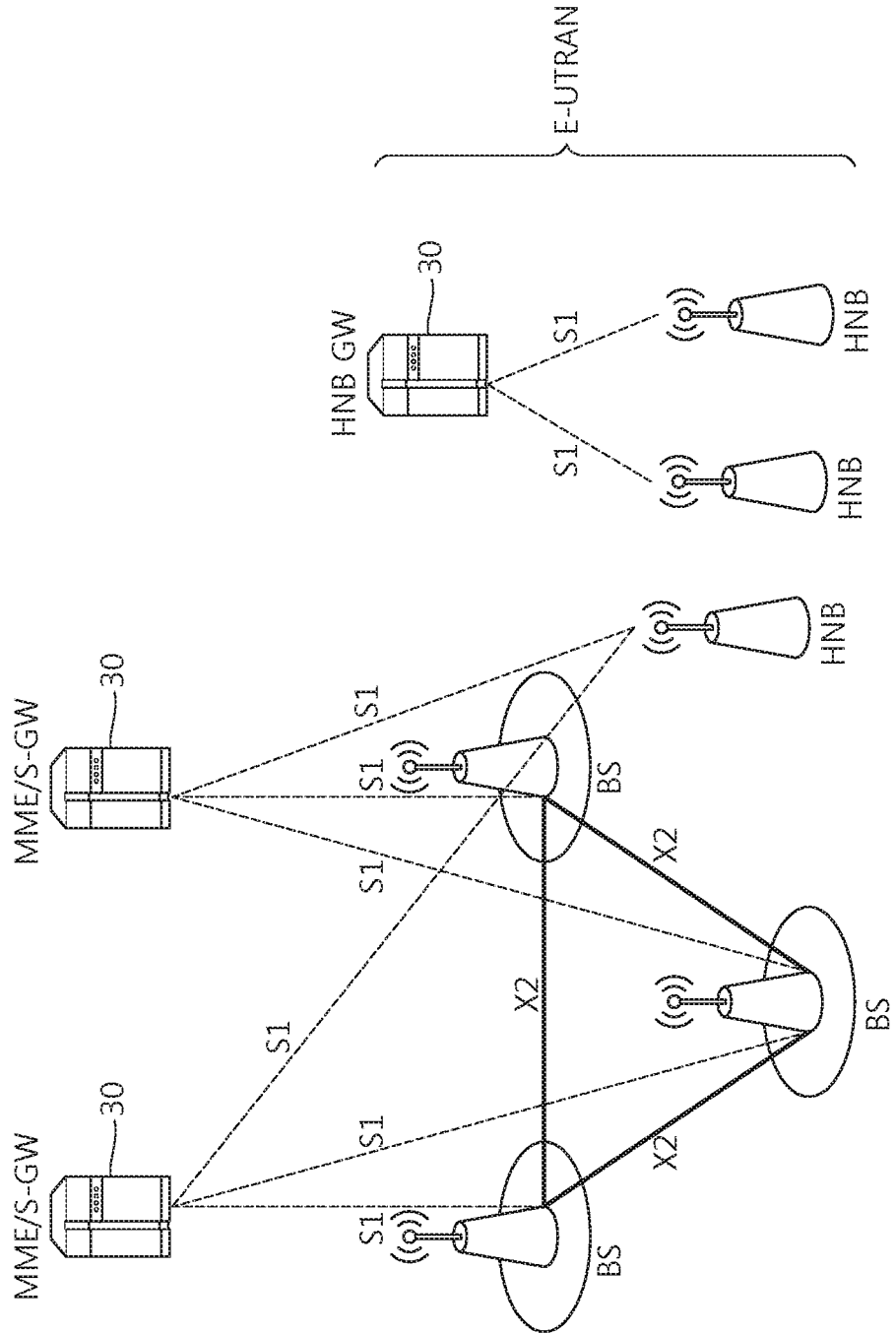
FIG. 4 is an exemplary view illustrating a network architecture for managing an HNB by using an HNB gateway.

FIG. 4 is an exemplary view illustrating a network architecture for managing an HNB by using an HNB gateway (GW).

HNBs may be connected to EPC via HNB GW or directly connected to EPC. Here, the HNB GW is regarded as a typical BS to MME. Also, the HNB GW is regarded as the MME to the HNB. Therefore, an S1 interface is connected between HNB and HNB GW, and also an S1 interface is connected between the HNB GW and the EPC. Furthermore, even in case of directly connecting between HNB and EPC, it is connected via an S1 interface. The function of HNB is almost similar to the function of a typical BS.

In general, HNB has a low radio transmission output power compared to the BS owned by mobile communication service providers. Therefore, the service coverage provided by HNB is typically smaller than the service coverage provided by (e)NB. Due to such characteristics, the cell provided by HNB is classified as a femto cell in contrast to a macro cell provided by (e)NB from a standpoint of the service coverage.

From a standpoint of provided services, when HNB provides those services only to a CSG group, the cell provided by this HNB is referred to as a CSG cell.

Each CSG has its own identifier which is called a CSG ID (CSG identity). The UE may have a CSG list to which the UE itself belongs as a member thereof, and this CSG list may be changed by a request of the UE or a command of the network. In the current specification of the 3GPP, one HNB may support one CSG A UE has a list of CSGs to which the UE belongs as a member. This list is called as a CSG white list.

HNB delivers the CSG ID of the CSG being supported by itself through the system information, thereby allowing only the corresponding CSG member UE to be accessed. When a CSG cell is found by the UE, what CSG being supported by this CSG cell can be checked by reading the CSG ID included in the system information. The UE that has read the CSG ID regards the corresponding cell as an accessible cell only if the UE itself is a member of the corresponding CSG cell or the CSG corresponding to the CSG ID is included in the UE's CSG white list.

It is not always required for HNB to allow only the CSG UE to be accessed. Based on the configuration setting of HNB, non-CSG member UE may be allowed to be accessed. The type of UE allowed to be accessed may be changed based on the configuration setting of HNB. Here, the configuration setting denotes the setting of the access mode (or may be called as operation mode) of HNB. The access mode of HNB can be divided into three types as follows based on the type of UE.

1) Closed access mode: A mode in which services are provided to particular CSG members only. A CSG cell is provided by the HNB.

2) Open access mode: A mode in which services are provided without any restriction of particular CSG members like typical (e)NB. The HNB provides a typical cell not a CSG cell. For clarity, a macro cell is a cell operated by the open access mode.

3) Hybrid access mode: A mode in which CSG services are provided to particular CSG members and also services are provided to non-CSG members like a typical cell. It is recognized as a CSG cell for the CSG member UE, and recognized as a typical cell for the non-CSG member UE. This cell is called a hybrid cell.

HNB notifies the UE that the cell being serviced by itself is a CSG cell or typical cell, allowing the UE to know whether or not it can be accessed to the corresponding cell. HNB being managed in a closed access mode broadcasts via the system information that it is a CSG cell. In this manner, HNB allows the system information to include a CSG indicator indicating whether or not the cell being serviced by itself is a CSG cell in the system information.

For example, the CSG cell broadcasts by setting the CSG indicator to 'TRUE'. If the cell being serviced is not a CSG cell, then it may be used a method that the CSG indicator may be set to 'FALSE' or the transmission of the CSG indicator is omitted. The UE should distinguish a typical cell from a CSG cell, and thus a typical BS may also transmit the CSG indicator (for example, the CSG indicator set to 'FALSE'), thereby allowing the UE to know that the cell type provided by itself is a typical cell. Furthermore, the typical BS may not transmit the CSG indicator, thereby allowing the UE to know that the cell type provided by itself is a typical cell, too.

The CSG-related parameters transmitted by the corresponding cell for each cell type are represented in Table 1. The CSG-related parameters may be transmitted via system information.

TABLE 1

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

The types of UE allowed to be accessed for each cell type are represented in Table 2.

TABLE 2

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

Figure 5:
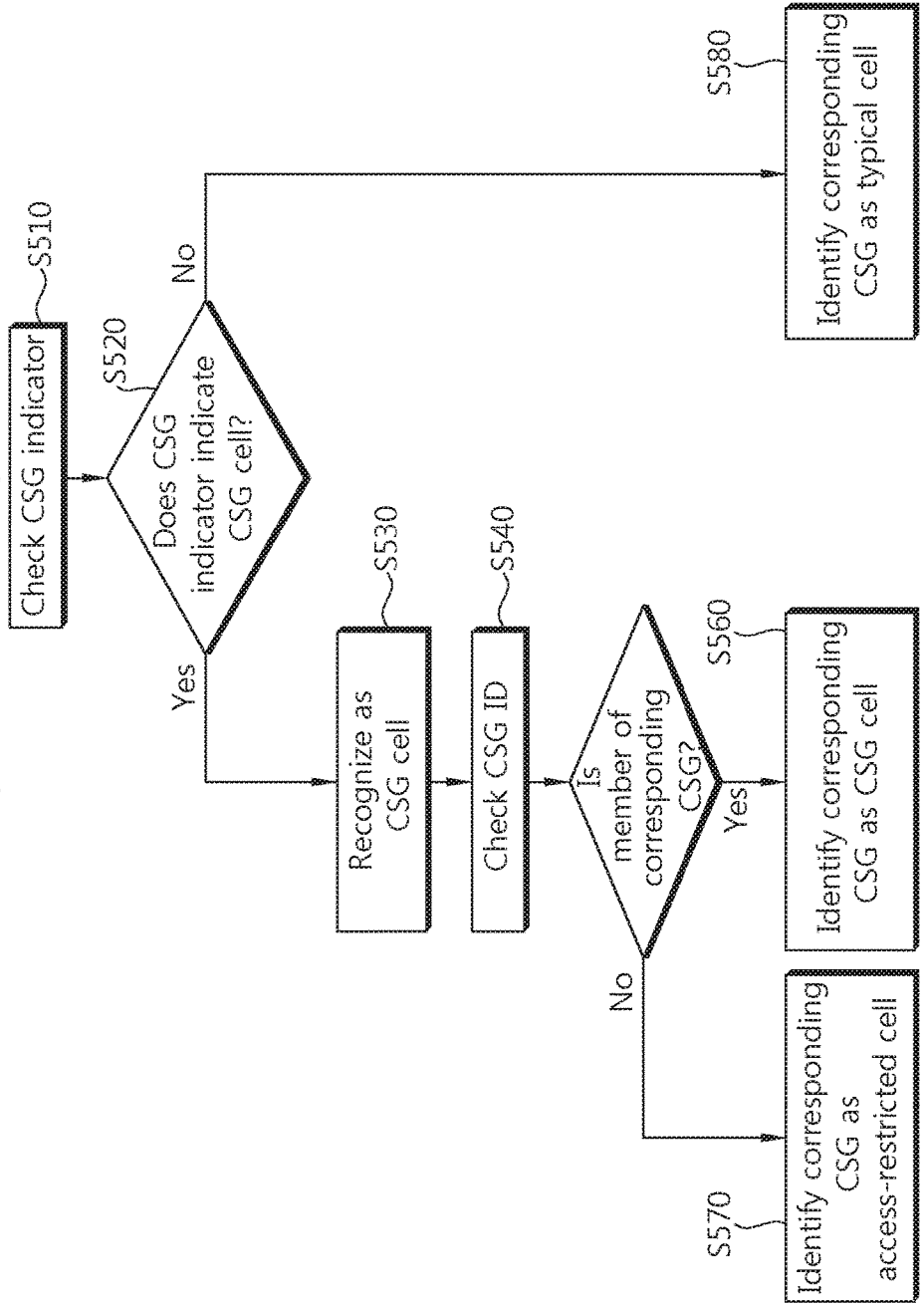
FIG. 5 is a flowchart illustrating a method of checking the access mode of a base station by the UE.

FIG. 5 is a flowchart illustrating a method of checking the access mode of a base station by the UE.

A UE checks a CSG indicator in system information of a target cell in order to confirm what is the type of the target cell (S510).

After checking the CSG indicator, if the CSG indicator indicates that the target cell is a CSG cell, then the UE recognizes the corresponding cell as the CSG cell (S520, S530). The UE checks the CSG ID in the system information in order to check whether or not the UE itself is a CSG member of the target cell (S540).

If it is checked from the CSG ID that the UE is a CSG member of the target cell, then the corresponding cell will be recognized as an accessible CSG cell (S550, S560). If it is checked from the CSG ID that the UE is not a CSG member of the target cell, then the corresponding cell will be recognized as an inaccessible CSG cell (S550, S570).

If the CSG indicator indicates that the target cell is not a CSG cell, then the UE recognizes the target cell as a typical cell (S520, S580). Furthermore, if the CSG indicator is not transmitted in the step S510, the UE recognizes the object cell as a typical cell.

In general, CSG cells and macro cells may be concurrently managed in a particular frequency. A CSG dedicated frequency is a frequency in which CSG cells exist only. A mixed carrier frequency is a frequency in which CSG cells and macro cells exist. The network may reserve a physical layer cell identifier for the CSG cell in a mixed carrier frequency. The physical layer cell identifier is called a Physical Cell Identity (PCI) in E-UTRAN, and called a Physical Scrambling Code (PSC) in UTRAN. For clarity, the physical layer cell identifier will be expressed by PCI.

The CSG cell notifies information on the PCI reserved for CSG cell at a current frequency via the system information.

The UE received this information can determine whether or not this cell is a CSG cell from the PCI of the cell when a certain cell is found at the corresponding frequency. How this information being used by the UE will be illustrated below in case of two types of UE.

First, in case of the UE, not supporting the CSG-related function or having no CSG list to which the UE itself belongs, the UE does not need to regard a CSG cell as a selectable cell during the cell selection/reselection process or handover. In this case, the UE checks only the PCI of the cell, and then the UE may immediately eliminate the corresponding cell during the cell selection/reselection process or handover if the PCI is a reserved PCI for CSG. Typically, the PCI of a certain cell may be immediately known during a process of checking the existence of the corresponding cell in a physical layer by the UE.

Second, in case of the UE having a CSG list to which the UE itself belongs, when the UE wants to know a list of the neighboring CSG cells at a mixed carrier frequency it may be known that the corresponding cell is a CSG cell if only a cell having the PCI reserved for CSG is found, instead of individually checking the CSG identity of the system information of every cell found in the whole PCI range.

Hereinafter, handover to CSG cell will be described in detail.

While the UE is in RRC_CONNECTED state, the UE performs normal measurement and mobility procedures based on configuration provided by the network. Handover to a CSG cell is different from the normal handover procedure in three aspects:

(1) Proximity Estimation: in case the UE is able to determine, using autonomous search procedures, that it is near a CSG cell or hybrid cell whose CSG ID is in the UE's CSG whitelist, the UE may provide to the source BS an indication of proximity.

(2) PSC/PCI Confusion: due to the typical cell size of HNBs being much smaller than macro cells, there can be multiple HNBs within the coverage of the source BS that have the same PSC/PCI. This leads to a condition referred to as PSC/PCI confusion, wherein the source BS is unable to determine the correct target cell for handover from the PSC/PCI included in the measurement reports from the UE. PSC/PCI confusion is solved by the UE reporting the global cell identity of the target HNB.

(3) Access Control: if the target cell is a hybrid cell, prioritization of allocated resources may be performed based on the UE's membership status. Access control is done by a two step process, where first the UE reports the membership status based on the CSG ID received from the target cell and the UE's CSG whitelist, and then the network verifies the reported status.

Figure 6:
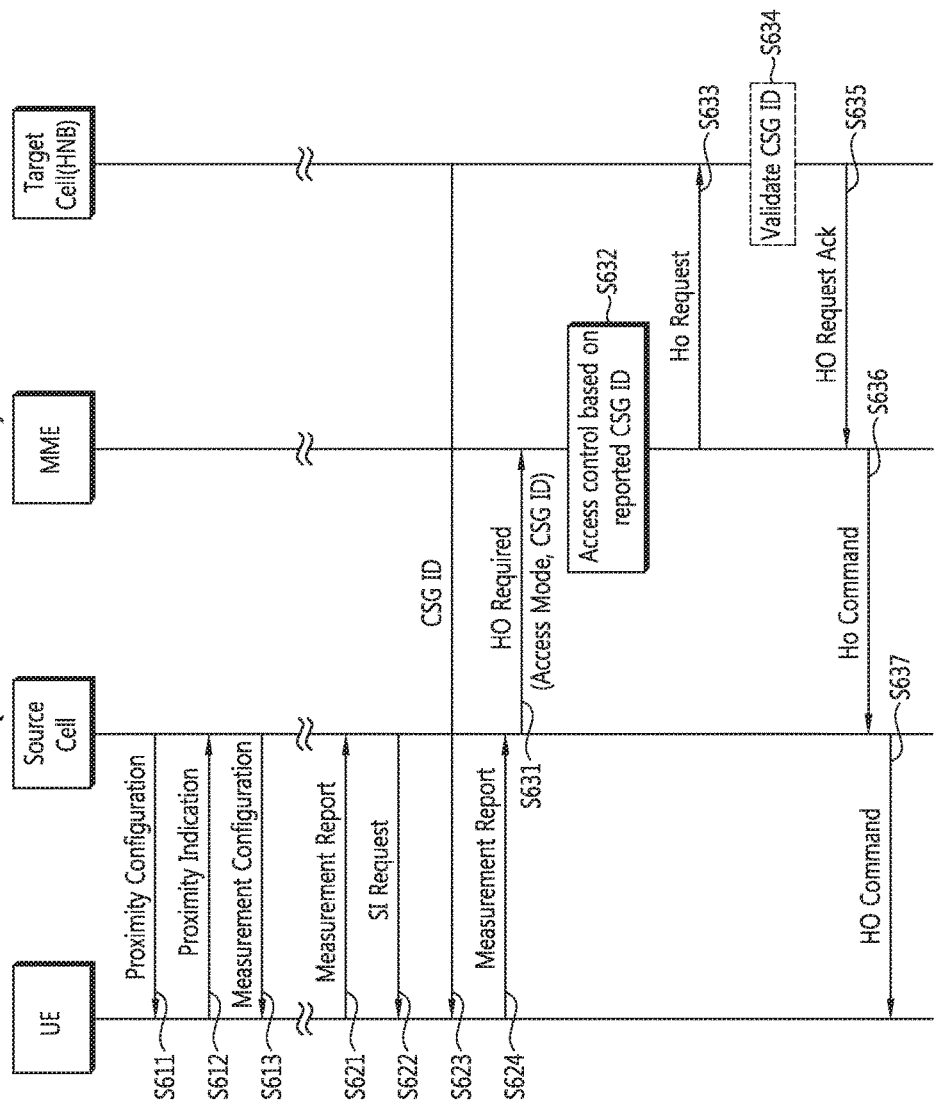
FIG. 6 is a flowchart illustrating a handover to a CSG cell. The source cell can be a CSG cell or non-CSG cell. The target cell can be a CSG cell.

FIG. 6 is a flowchart illustrating a handover to a CSG cell. The source cell can be a CSG cell or non-CSG cell. The target cell can be a CSG cell.

A source cell in which the UE is currently camping configures the UE with a proximity indication control (S611).

The UE sends an "entering" proximity indication when it determines it may be near a cell (based on autonomous search procedures) whose CSG ID is in the UE's CSG whitelist (S612). The proximity indication includes the RAT and frequency of the cell.

After sending an "entering" proximity indication, if the UE determines that it is no longer near a cell whose CSG ID is in the UE's CSG whitelist, the UE sends a "leaving" proximity indication to the source cell. Upon reception of this indication, the source cell may reconfigure the UE to stop measurements on the reported RAT and frequency.

If a measurement configuration is not present for the concerned frequency/RAT the source cell configures the UE with relevant measurement configuration including measurement gaps as needed, so that the UE can perform measurements on the reported RAT and frequency (S613). The network may also use the proximity indication to minimize the requesting of handover preparation information of CSG/hybrid cells by avoiding requesting such information when the UE is not in the geographical area where cells whose CSG IDs are in the UEs CSG White-list are located.

The UE sends a measurement report including the PCI (S621).

The source cell configures the UE to perform SI acquisition and reporting of a particular PCI (S622).

The UE performs SI acquisition using autonomous gaps, i.e., the UE may suspend reception and transmission with the source cell within a specific limit to acquire the relevant system information from the target cell (S623).

The UE sends a measurement report including CSG ID and a membership status (S624). The membership status indicates whether the UE is a member of the CSG cell.

The source cell includes the CSG ID in the Handover Required message sent to a MME (S631).

The MME performs UE access control to the CSG cell based on the CSG ID received in the Handover Required message and the stored CSG subscription data for the UE (S632). If the access control procedure fails, the MME ends the handover procedure by replying with the Handover Preparation Failure message. If the Cell Access Mode is present, the MME determines the CSG Membership Status of the UE handing over to the CSG cell and includes it in the Handover Request message.

The MME sends the Handover Request message to the target cell including the target CSG ID received in the Handover Required message (S633).

The target cell verifies that the CSG ID received in the Handover Request message matches the CSG ID broadcast in the target cell and if such validation is successful it allocates appropriate resources (S634). UE prioritisation may also be applied if the CSG Membership Status indicates that the UE is a member.

The target cell sends the Handover Request Acknowledge message to the MME via the HNB GW if present (S635).

The MME sends the Handover Command message to the source cell (S636).

The source cell transmits the Handover Command (i.e., RRC Connection Reconfiguration message including mobility control information) to the UE (S637).

In the above procedure, steps S612 and S613 may not be performed in case the UE has not previously visited the HNB, e.g., when the UE first visits a hybrid cell.

The PCI confusion is resolved by steps S622, S623 and S624. The source cell can request SI acquisition and reporting for any PCI, not limited to PSCs/PCIs of CSG or hybrid cells.

To identify a target cell for handover, the serving cell may request the UE to report CSG subscription information.

Figure 7:
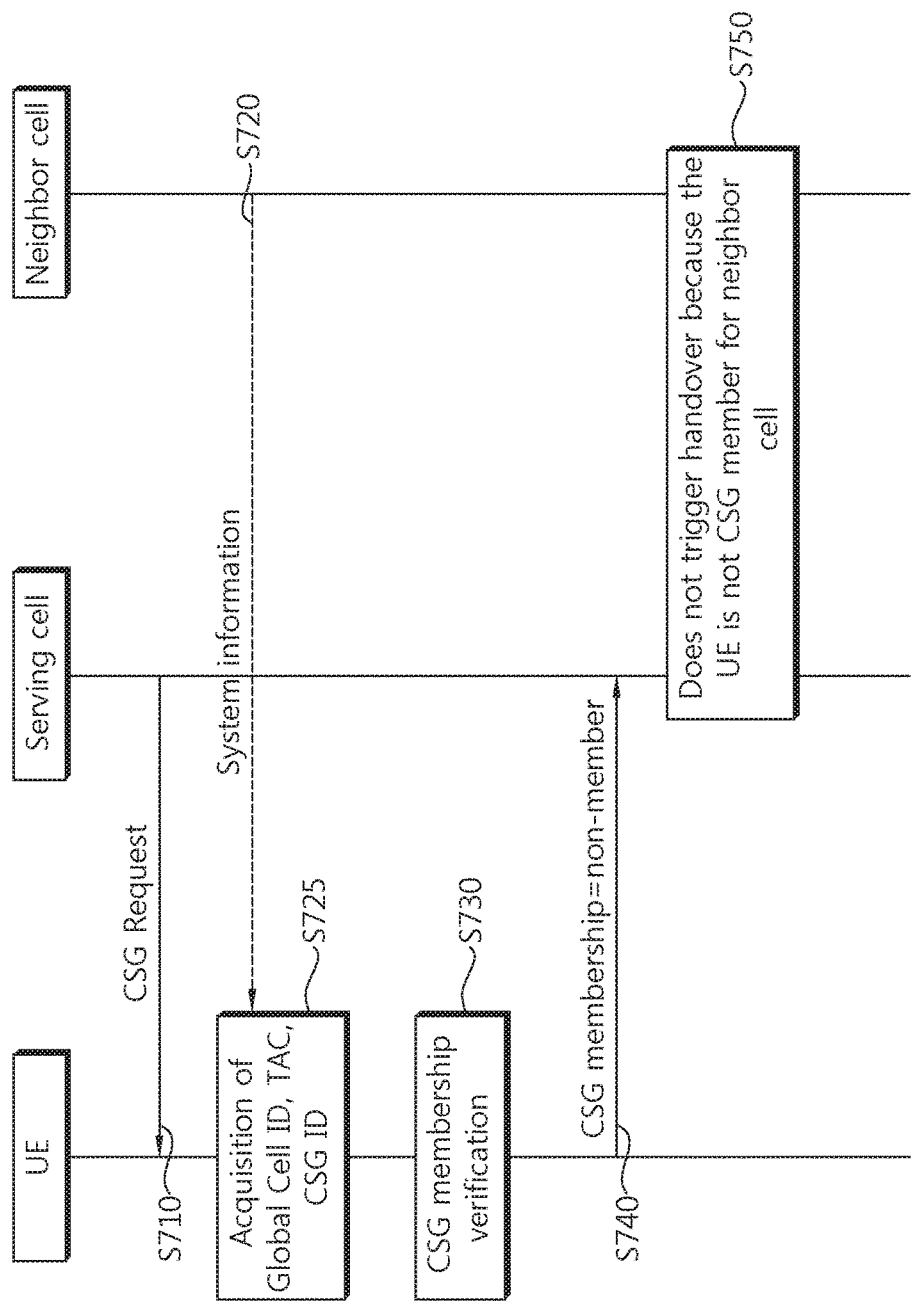
FIG. 7 is a flowchart illustrating a method for reporting CSG subscription information.

FIG. 7 is a flowchart illustrating a method for reporting CSG subscription information.

A UE receives a CSG request from a serving cell (S710). The CSG request may request the UE to report CSG subscription of a neighbor cell.

The UE receives system information broadcast by the neighbor cell (S720). Based on the system information, the UE acquires a PCI, a global cell identity, a tracking area code (TAC) and a CSG ID (S725). The global cell identity may include an identity of RPLMN of the neighbor cell and the cell identity of the neighbor cell.

The UE performs CSG membership verification (S730). Based on CSG ID, the UE determines whether the UE is a CSG member of the neighbor cell. If a CSG whitelist of the UE includes the CSG ID, the UE is the CSG member of the neighbor cell.

Assuming that the CSG whitelist of the UE does not include the CSG ID at the RPLMN of the neighbor cell, the UE is not the CSG member of the neighbor cell.

The UE sends to the serving cell a CSG membership status indicating that the UE is not the CSG member of the neighbor cell (S740).

Since the UE is not the CSG member of the neighbor cell, the serving cell does not trigger the handover to the neighbor cell (S750).

In general, one base station belongs to one PLMN (i.e. RPLMN). However, in order to facilitate network installation and achieve cost reduction, a plurality of service providers may share one base station. This is called as RAN sharing. The cell may broadcast additional PLMN identities associated with all shared service providers. The additional PLMN identities includes multiple PLMN identities, which may include a primary PLMN identity and one or more secondary PLMN identity. The primary PLMN identity may include a PLMN identity of RPLMN or EPLMN. The secondary PLMN identity may include a PLMN identity of EPLMN or RPLMN. According to the CSG subscription reporting of FIG. 7, the UE cannot support the RAN sharing since the UE does not consider the additional PLMN identities to determine the CSG membership status.

Figure 8:
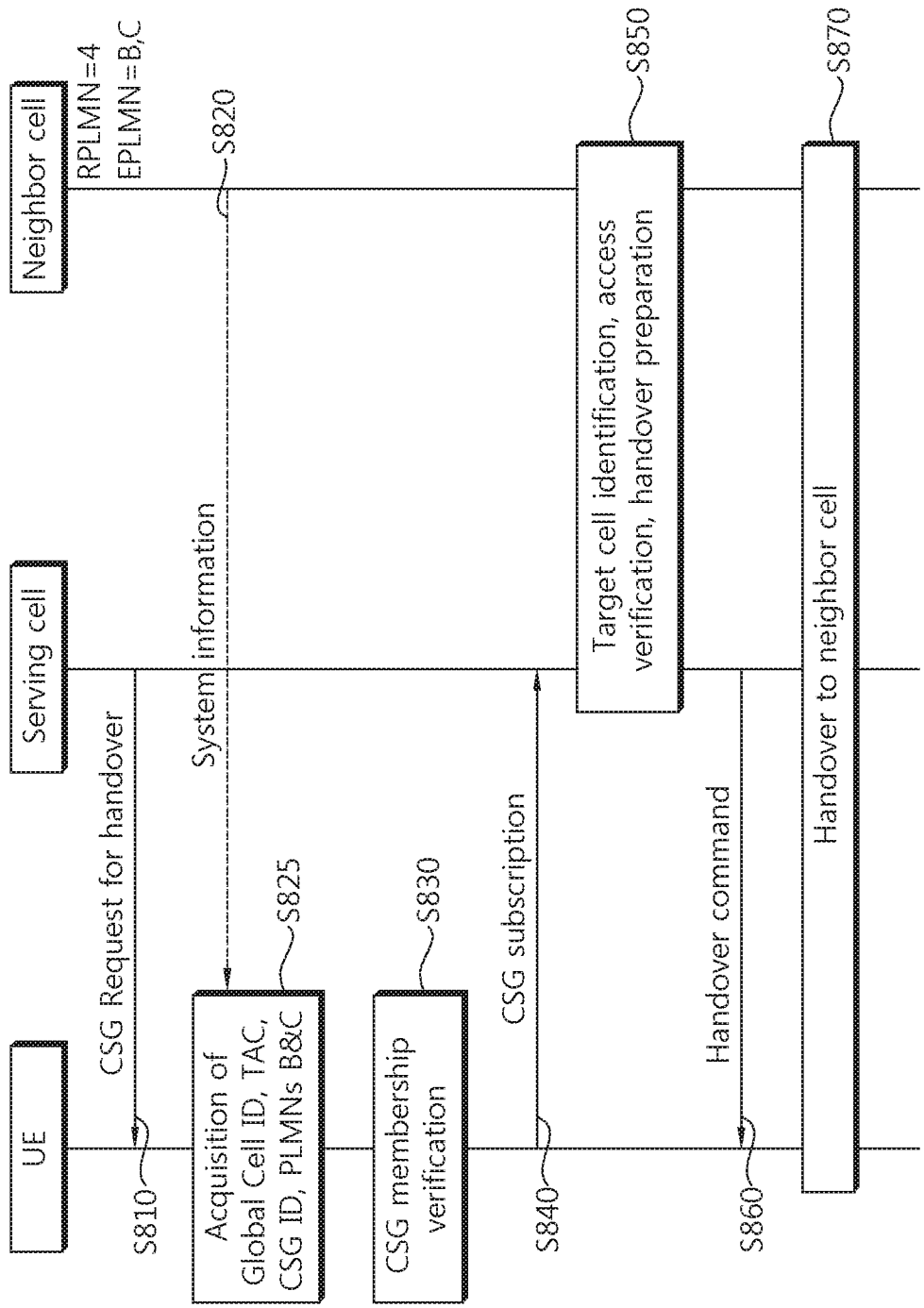
FIG. 8 is a flowchart illustrating a method for supporting CSG service according to an embodiment of the present invention.

FIG. 8 is a flowchart illustrating a method for supporting CSG service according to an embodiment of the present invention.

A UE receives a CSG request from a serving cell (S810). The purpose of the CSG request may be associated with a handover to a neighbor cell. The neighbor cell is a CSG cell and belongs to a plurality of PLMNs. For exemplary purpose only, it is assumed that there are three PLMN identities, i.e. one first PLMN identity for RPLMN A and two second PLMN identities for EPLMN B and C.

The UE receives cell information (i.e. system information) broadcast by the neighbor cell (S820). Based on the cell information, the UE may acquire a PCI, a list of PLMN identities, a tracking area code (TAC) and a CSG ID (S825). The list of PLMN identities may include PLMN identities for RPLMN A, EPLMN B and EPLMN C. A primary PLMN identity includes a first PLMN identity of the list of PLMN identities. Secondary PLMN identities includes PLMN identities following the primary PLMN identity in the list of PLMN identities. The UE may acquire a global cell identity as combination of the primary PLMN identity and a cell identity that uniquely identifies the neighbor cell within the primary PLMN.

The UE performs CSG membership verification (S830). The UE may determines whether the neighbor cell is a CSG member cell or not. A CSG whitelist includes at least one pair of CSG ID and PLMN identity. i.e. {CSG ID_1, PLMN ID_1}, {CSG ID_2, PLMN ID_2}, . . . , {CSG ID_N, PLMN ID_N}, where CSG ID_n denotes CSG ID for PLMN identity corresponding to PLMN_ID_n. The neighbor cell is the CSG member cell if CSG ID of the neighbor cell and one PLMN identity in the list of PLMN identities are included in the CSG whitelist. For example, when the CSG whitelist includes {CSG ID of the neighbor cell, PLMN C}, the neighbor cell is a CSG member cell of the UE.

To support inter-PLMN CSG mobility, the UE acquires all PLMN identities of the concerned cell that is shared by multiple PLMNs, to examine whether there is a PLMN to which access is allowed. The UE may acquire additional PLMN IDs when the serving cell requests CSG information for handover.

The UE reports CSG subscription information to the serving cell (S840). The CSG subscription information may include the global cell identity, the TAC, the CSG ID and a CSG membership indicator. When the neighbor cell is a CSG member cell of the UE, the CSG membership indicator set to 'member' may be included in the CSG subscription information. The CSG membership may not be included or the CSG membership indicator set to 'non-member' may be included in the CSG subscription information if the neighbor cell is not the CSG member cell.

If the neighbor cell is the CSG member cell of the UE, the serving cell transfers the received CSG subscription information to MME, and MME performs access verification. If the access verification is successful, the MME will perform handover preparation with the neighbor cell (S850). Then the neighbor cell sends a handover command to the source cell.

If it is determined as the handover to the neighbor cell, the serving cell may send a handover command to the UE (S860).

The UE may perform the handover to the neighbor cell (S870).

The UE can perform handover to a CSG cell which supports multiple PLMNs.

Figure 9:
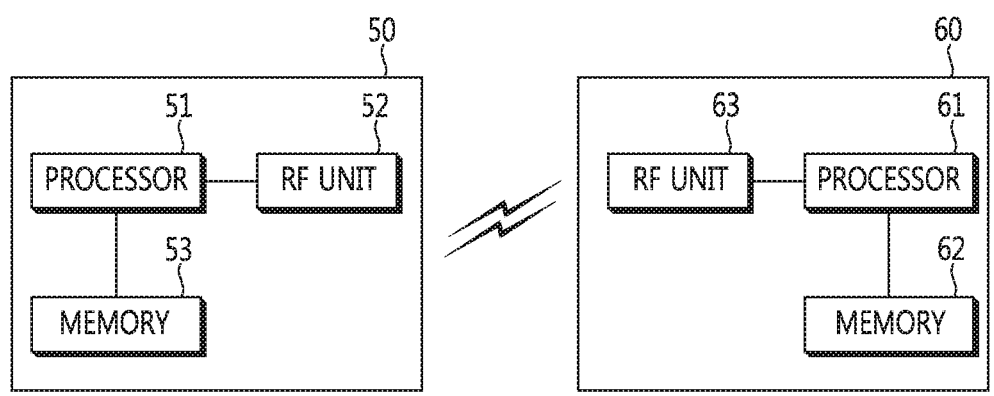
FIG. 9 is a block diagram showing wireless communication system to implement an embodiment of the present invention.

FIG. 9 is a block diagram showing wireless communication system to implement an embodiment of the present invention.

A BS 50 may include a processor 51, a memory 52 and a radio frequency (RF) unit 53. The memory 52 is operatively coupled with the processor 51 and stores a variety of information to operate the processor 51. The RF unit 53 is operatively coupled with the processor 11, and transmits and/or receives a radio signal. The processor 51 may be configured to implement proposed functions, procedures and/or methods described in this description. Layers of the radio interface protocol may be implemented in the processor 51. The processor 51 may implement operations of the serving cell or the neighbor cell in an embodiment of FIG. 8.

A UE 60 may include a processor 61, a memory 62 and a RF unit 63. The memory 62 is operatively coupled with the processor 61 and stores a variety of information to operate the processor 61. The memory may include a CSG whitelist. The RF unit 63 is operatively coupled with the processor 61, and transmits and/or receives a radio signal. The processor 61 may be configured to implement proposed functions, procedures and/or methods described in this description. The processor 61 may implement operations of the UE in an embodiment of FIG. 8.

The processors 51, 61 may include application-specific integrated circuit (ASIC), other chipset, logic circuit and/or data processing device. The memories 52, 62 may include read-only memory (ROM), random access memory (RAM), flash memory, memory card, storage medium and/or other storage device. The RF units 53, 63 may include baseband circuitry to process radio frequency signals. When the embodiments are implemented in software, the techniques described herein can be implemented with modules (e.g., procedures, functions, and so on) that perform the functions described herein. The modules can be stored in memories 52, 62 and executed by processors 51, 61. The memories 52, 62 can be implemented within the processors 51, 61 or external to the processors 51, 61 in which case those can be communicatively coupled to the processors 51, 61 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for supporting a closed subscriber group (CSG) service in a wireless communication system, the method performed by a user equipment (UE) and comprising:
    determining whether a CSG identity is broadcasted from a neighbor cell;
    determining whether multiple Public Land Mobile Network (PLMN) identities are broadcasted from the neighbor cell;
    determining whether the UE is a CSG member of the neighbor cell based on at least one of the multiple PLMN identities, if the CSG identity is broadcasted;
    setting a CSG member status field to a "member", if the UE is the CSG member; and
    reporting a measurement report including the CSG member status field and the CSG identity of the neighbor cell.

2. The method of claim 1, further comprising:
    receiving, by the UE from the serving cell, a request for the measurement report.

3. The method of claim 2, wherein the request for the measurement report is associated with a handover of the UE from the serving cell to the neighbor cell.

4. The method of claim 1, wherein the multiple PLMN identities include a first PLMN identity and at least one second PLMN identity of the neighbor cell.

5. The method of claim 4, further comprising:
    determining that the UE is a CSG member when a CSG whitelist of the UE includes the CSG identity and one of the first and second PLMN identities.

6. The method of claim 4, wherein the first PLMN identity identifies a registered PLMN of the UE and the at least one second PLMN identity identifies an equivalent PLMN of the UE.

7. The method of claim 4, wherein the first PLMN identity identifies an equivalent PLMN of the UE and the at least one second PLMN identity identifies a registered PLMN of the UE.

8. A user equipment (UE) configured for supporting a closed subscriber group (CSG) service in a wireless communication system, the UE comprising:
    a memory configured to store a CSG whitelist of the UE; and
    a processor operatively coupled to the memory and configured to:
        determine whether a CSG identity is broadcasted from a neighbor cell;
        determine whether multiple Public Land Mobile Network (PLMN) identities are broadcasted from the neighbor cell;
        determine whether the UE is a CSG member of the neighbor cell based on at least one of the multiple PLMN identities, if the CSG identity is broadcasted;
        set a CSG member status field to a "member", if the UE is the CSG member; and
        report a measurement report including the CSG member status field and the CSG identity of the neighbor cell.

9. The UE of claim 8, wherein the processor is further configured to:
    receive, from the serving cell, a request for the measurement report.

10. The UE of claim 9, wherein the request for the measurement report is associated with a handover of the UE from the serving cell to the neighbor cell.

11. The UE of claim 8, wherein the multiple PLMN identities include a first PLMN identity and at least one second PLMN identity of the neighbor cell.

12. The UE of claim 11, wherein the processor is further configured to:
    determine that the UE is a CSG member when a CSG whitelist of the UE includes the CSG identity and one of the first and second PLMN identities.

13. The UE of claim 11, wherein the first PLMN identity identifies a registered PLMN of the UE and the at least one second PLMN identity identifies an equivalent PLMN of the UE.

14. The UE of claim 11, wherein the first PLMN identity identifies an equivalent PLMN of the UE and the at least one second PLMN identity identifies a registered PLMN of the UE.

* * * * *